United States Patent [19]
Moore et al.

[11] Patent Number: 5,144,911
[45] Date of Patent: Sep. 8, 1992

[54] COMPONENT BED SYSTEM FOR A PET

[76] Inventors: Cheri L. Moore; Judy L. Hall, both of 2708 Springbrooke, Hurst, Tex. 76054

[21] Appl. No.: 619,099
[22] Filed: Nov. 28, 1990
[51] Int. Cl.⁵ .................. A01K 29/00; A47G 9/06
[52] U.S. Cl. ............................ 119/28.5; 5/420; 5/470; 5/490
[58] Field of Search ............ 119/28.5, 174; 5/420, 5/417, 470, 490

[56] References Cited

U.S. PATENT DOCUMENTS

| D. 219,743 | 1/1971 | Murray | D30/41 |
|---|---|---|---|
| D. 245,716 | 9/1977 | Russo | D30/41 |
| D. 256,734 | 9/1980 | Riley | D30/41 |
| D. 288,636 | 3/1987 | McLaren | D6/383 |
| D. 295,904 | 5/1988 | McMahon | D30/118 |
| D. 309,200 | 7/1990 | McMahon | D30/118 |
| 1,569,710 | 1/1926 | Burt | D30/118 |
| 2,775,222 | 12/1956 | Kruck | D30/118 |
| 2,834,970 | 5/1958 | Nappe | 5/420 |
| 3,308,490 | 3/1967 | Cacioppo | 5/470 |
| 3,565,040 | 2/1971 | Pohl | 119/28.5 |
| 3,989,008 | 11/1976 | Neumann | 119/28.5 |
| 4,169,428 | 10/1979 | Waugh | 119/28.5 |
| 4,649,861 | 3/1987 | Elkins et al. | 119/28.5 |
| 4,706,313 | 11/1987 | Murphy | 5/470 |
| 4,780,921 | 11/1988 | Lahn et al. | 5/490 |
| 4,899,693 | 2/1990 | Arnold | 119/28.5 |
| 4,930,170 | 6/1990 | Kobayashi | 5/420 |
| 4,969,223 | 11/1990 | Yamaguchi | 5/470 |

*Primary Examiner*—John G. Weiss
*Attorney, Agent, or Firm*—Haugen and Nikolai

[57] ABSTRACT

A component bed system for a pet is provided and consists of a mattress pad, an inner liner around the mattress pad, a cover to fit about the inner liner on the mattress pad and a mat placed upon the cover so that the pet can recline and sleep thereon in comfort.

14 Claims, 2 Drawing Sheets

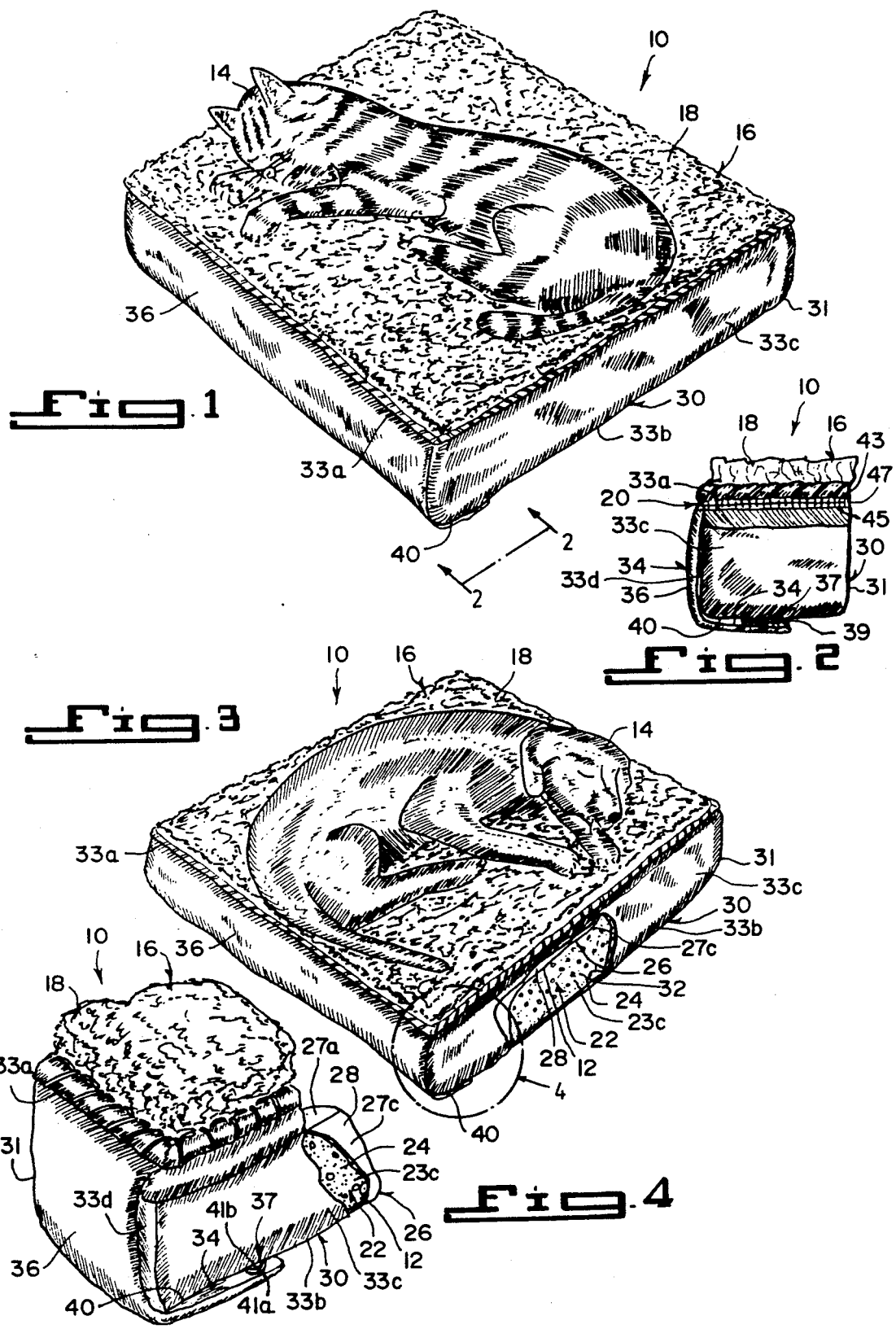

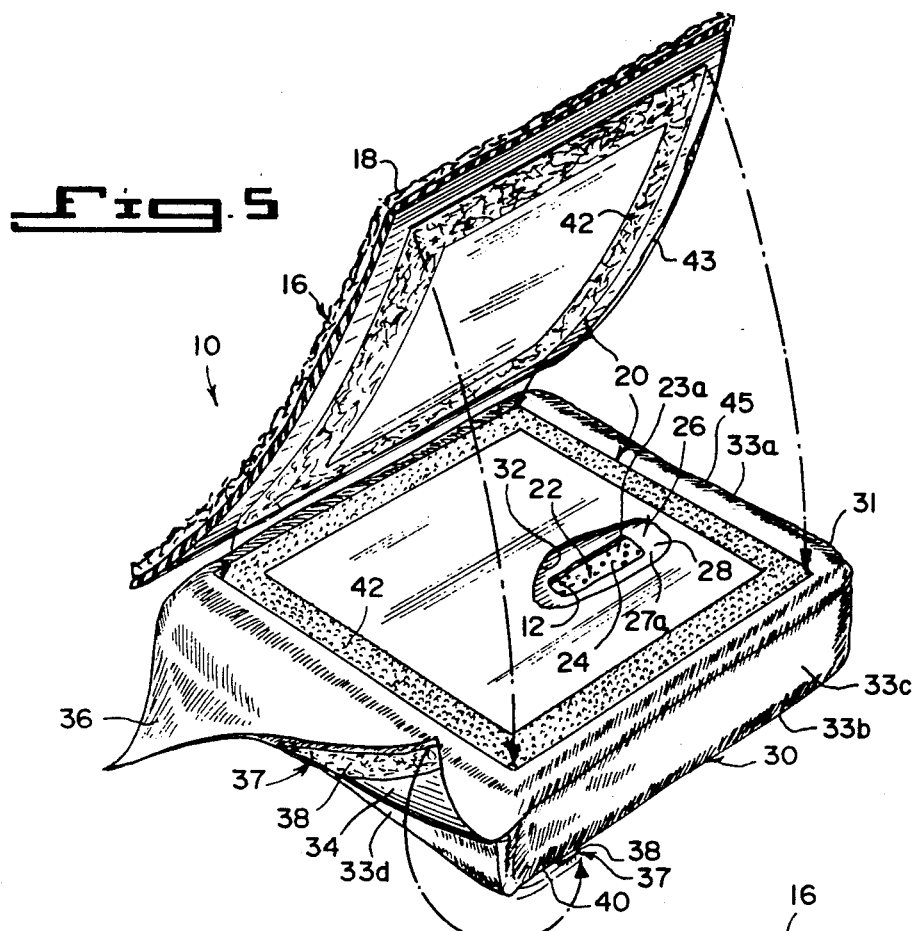
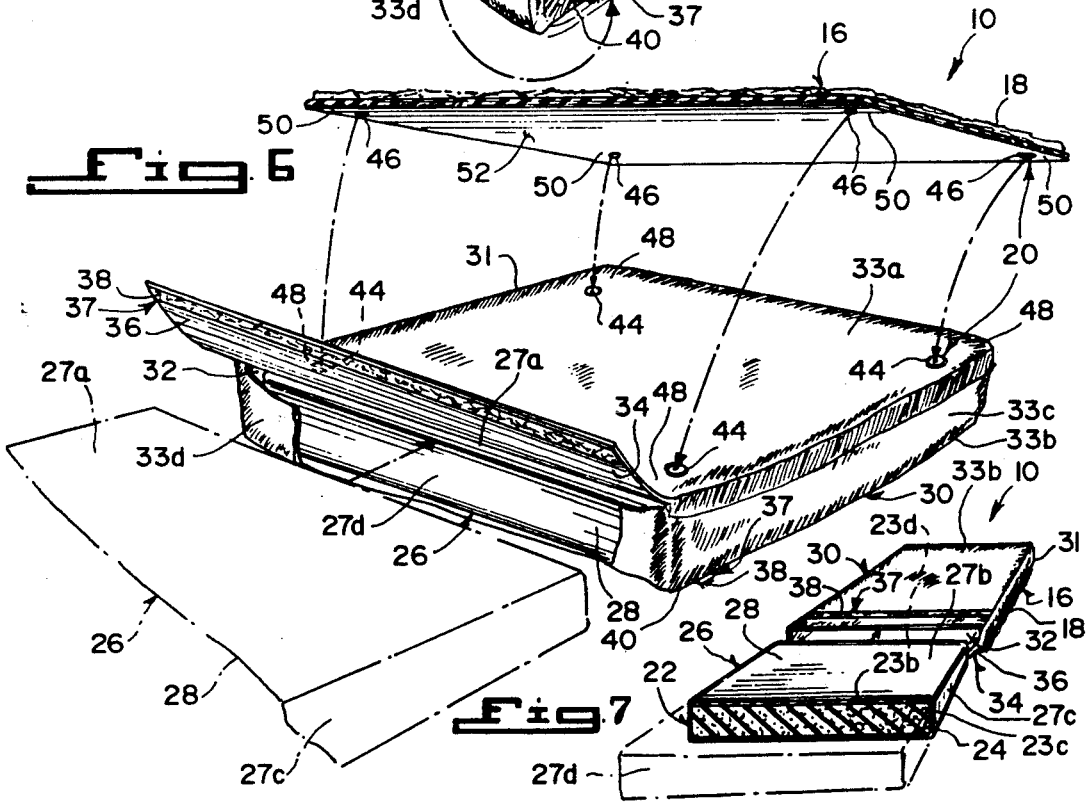

5,144,911

COMPONENT BED SYSTEM FOR A PET

BACKGROUND OF THE INVENTION

1. Field of the Invention

The instant invention relates generally to small animal beds and more specifically it relates to a component bed system for a pet.

2. Description of the Prior Art

Numerous small animal beds have been provided in the prior art hereinafter in the form of baskets, trays and pallets containing a soft fabric upon which the animals may rest and sleep. While these units may be suitable for the particular purpose to which they address, they would not be as suitable for the purposes of the present invention as heretofore described.

SUMMARY OF THE INVENTION

A primary object of the present invention is to provide a component bed system for a pet that will overcome the shortcomings of the prior art devices.

Another object is to provide a component bed system for a pet that will be fabricated out of comfortable soft and protective materials so that the pet may sleep and recline thereon in a clean environment.

An additional object is to provide a component bed system for a pet that includes four basic components which can be detachable and removable from each other so that some or all of the components can be cleaned and replaced when needed.

A further object is to provide a component bed system for a pet that is simple and easy to use.

A still further object is to provide a component bed system for a pet that is economical in terms of cost to manufacture.

Further objects of the invention will appear as the description proceeds.

To accomplish the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention with a cat sleeping thereon.

FIG. 2 is a side view of a portion of the instant invention taken in direction along line 2—2 in FIG. 1.

FIG. 3 is a perspective view with parts broken away similar to FIG. 1, with a dog sleeping thereon.

FIG. 4 is an enlarged perspective view of a corner as indicated by arrow 4 in FIG. 3.

FIG. 5 is a partial exploded perspective view, with parts broken away, showing the mat detachably secured to the top wall of the cover by a set of hook and loop pile fabric fastener strips.

FIG. 6 is a partial exploded perspective view with parts broken away, showing the mat detachably secured to the top wall of the cover by male and female snap members.

FIG. 7 is a partial exploded bottom perspective view, with the mattress pad within the inner liner in section and pulled out from the cover.

DETAILED DESCRIPTION OF THE PREFERRED EMBODIMENTS

Turning now to the drawings, in which like reference characters denote similar elements throughout the several views, the Figures illustrate a component bed system 10 for a pet 14, consisting of a mattress pad 22, an inner liner 26 around the mattress pad 22, a cover 30 to fit about the inner liner 26 on the mattress pad 22 and a mat 16 placed upon the cover 30 so that the pet 14, such as a cat or dog, can recline and sleep thereon in comfort.

Description of the Mattress Pad 22

The mattress pad 22 may be fabricated out of a high density foam material 24 which is resistant to ultra violet light. The mattress pad 22 is also generally rectangular shaped and includes a top surface 23a, a bottom surface 23b, a pair of side surfaces 23c and a pair of end surfaces 23d.

Description of the Inner Liner 26

The inner liner 26 is fabricated out of a plastic impregnated disposable non-absorbent fabric material 28, which repels many foreign elements, such as hair, water, urine, debris or the like.

The inner liner 26 is also generally rectangular shaped and includes a top wall 27a, a bottom wall 27b, a pair of side walls 27c and a pair of end walls 27d forming a pocket 12 with one of the end walls 27d being a sealable flap so that the mattress pad 22 can be inserted into the pocket 12 and the flap end wall 27d sealed to act as a protection for the mattress pad 22 to keep it clean and eliminate odors therefrom.

Description of the Cover 30

The cover 30 is fabricated out of a water repellent nylon fabric material 31. The cover 30 is also generally rectangular shaped and includes a top wall 33a, a bottom wall 33b, a pair of side walls 33c, a pair of end walls 33d forming a pocket 32 with a flap 36 at one of the end walls 33d so that the mattress pad 22 in the inner liner 26 can be inserted into the pocket 32 and the flap 36 closed to act as a protective cover for the inner liner 26 and the mattress pad 22 to keep them both clean and dry.

A mechanism 37 is provided for detachably securing the flap 36 to the bottom wall 33b of the cover 30 when closed. The mechanism 37 as shown in FIGS. 5, 6 and 7 includes a set of hook and loop pile fabric fastener strips 38 attached to the inner surface 34 of the flap 36 and along one edge 40 of the bottom wall 33b of the cover 30 adjacent the end wall 33d nearest the flap 36, so as to engage with each other to keep said flap 36 closed. The mechanism 37, as shown in FIG. 2, includes a ZIPPER 39 attached to the inner surface 34 of the flap 36 and along one edge 40 of the bottom wall 33b of the cover 30 adjacent the end wall 33d nearest the flap 36 so as to keep the flap 36 closed.

The mechanism 37, as shown in FIG. 4, includes at least one male snap member 41a affixed to the inner surface 34 of the flap 36 and at least one female snap member 41b affixed to one edge 40 of said bottom wall 33b of the cover 30 adjacent the end wall 33d nearest the flap 36 so as to engage with the at least one male snap member 41a to keep the flap 36 closed.

Description of the Mat 16

The mat 16 is generally rectangular shaped and is fabricated out of a soft cloth fabric material 18, such as fleece or the like. A mechanism 20 is provided for detachably securing the mat 16 to the top wall 33a of the cover 30. The mechanism 20, as shown in FIG. 5, includes a second set of hook and loop pile fabric fastener strips 42 attached around the bottom perimeter 43 of the mat 16 and the perimeter 45 of the top wall 33a of the cover 30 so as to engage with each other to retain the mat 16 on the top wall 33a of the cover 30.

The mechanism 20, as shown in FIG. 2, includes a ZIPPER 47 attached around the bottom perimeter 43 of the mat 16 and the perimeter 45 of the top wall 33a of the cover 30 so as to retain the mat 16 on the top wall 33a of the cover 30. The mechanism 20, as shown in FIG. 6, includes at least four male snap members 44, each affixed to one corner 48 of the top wall 33a of the cover 30. At least four female snap members 46 are also provided with each affixed to one corner 50 on the bottom surface 52 of the mat 16, so as to engage with the male snap members 44 to retain the mat 16 on the top wall 33a of the cover 30.

The component bed system 10 may be purchased as a complete unit comprised of all four components together or any component or combination of components may be purchased separately.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A bed for an animal pet comprising, in combination:
   (a) a resilient mattress member having a top surface, a bottom surface and peripheral side wall disposed between said top and bottom surfaces;
   (b) a mattress liner comprising a pocket totally surrounding and tightly adhering to said top and bottom surfaces and said peripheral side wall and including a closeable opening through which said mattress member can be inserted and removed, said mattress liner exhibiting moisture repelling properties;
   (c) an outer cover member for totally enclosing said mattress member and said mattress liner therein, said cover member being formed from a tear-resistent, water-repellent fabric; and
   (d) a mat of soft fabric material releasably secured to said outer cover member overlaying said top surface so as to be easily removable from said outer cover member, said mat of soft fabric material comprising a resting surface for said animal pet.

2. The bed as recited in claim 1, wherein said mattress member is fabricated out of a high density foam material which is resistant to ultraviolet light.

3. The bed as recited in claim 2, wherein said mattress member is generally rectangular shaped and said peripheral side wall includes a pair of side surfaces and a pair of end surfaces.

4. The bed as recited in claim 3, wherein said outer cover member is fabricated from a nylon fabric material.

5. The bed as recited in claim 4, wherein said outer cover member is generally rectangular shaped and includes a top wall, a bottom wall, a pair of side walls, a pair of end walls joined together to form a pocket, with a flap at one of said end walls so that said mattress member and mattress liner can be inserted into said pocket and said flap closed to act as a protection for said mattress member and mattress liner to keep them clean and dry.

6. A bed as recited in claim 5, further including means for detachably securing said flap to said bottom wall of said cover member when closed.

7. A bed as recited in claim 6, wherein said detachably securing means for said flap includes a set of hook and loop pile fabric fastener strips attached to the inner surface of said flap and along one edge of said bottom wall of said cover member adjacent said end wall nearest said flap so as to engage with each other to keep said flap closed.

8. A bed as recited in claim 6, wherein said detachably securing means for said flap includes a ZIPPER attached to the inner surface of said flap and along one edge of said bottom wall of said cover member adjacent said end wall nearest said flap so as to keep said flap closed.

9. A bed as recited in claim 6, wherein said detachably securing means for said flap includes:
   a) at least one male snap member affixed to the inner surface of said flap; and
   b) at least one female snap member affixed to one edge of said bottom wall of said cover member adjacent said end wall nearest said flap so as to engage with said at least one male snap to keep said flap closed.

10. A bed as recited in claim 5, wherein said mat of soft fabric material is a fleece mat that is releasably secured to said outer cover member by a ZIPPER attached around the bottom perimeter of said pad and the perimeter of said top wall of said cover member so as to retain said pad on said top wall of said cover.

11. A bed as recited in claim 5, wherein said mat of soft fabric material is a fleece mat that is releasably secured to said outer cover member by a plurality of snaps.

12. A bed as recited in claim 1, wherein said mattress liner is fabricated out of a plastic impregnated disposable, cloth-like fabric material which repels foreign elements, including water and body fluids.

13. A bed as recited in claim 12, wherein said mattress liner is generally rectangular shaped and includes a top wall, a bottom wall, a pair of side walls and a pair of end walls forming a pocket with one of said end walls being a sealable flap so that said mattress member can be inserted into said pocket and said flap end wall sealed to act as a protection for said mattress member to keep it clean, dry and odor free.

14. A bed as recited in claim 1, wherein said mat of soft fabric material is a fleece mat that is releasably secured to said outer cover member by a set of hook and loop pile fabric fastener strips attached around the bottom perimeter of said pad and the perimeter of said top wall of said cover member so as to engage with each other to retain said pad on said top wall of said cover.

* * * * *